(12) United States Patent
Paffenroth et al.

(10) Patent No.: US 8,811,758 B2
(45) Date of Patent: Aug. 19, 2014

(54) LOSSY COMPRESSION OF DATA POINTS USING POINT-WISE ERROR CONSTRAINTS

(75) Inventors: Randy C. Paffenroth, Loveland, CO (US); Ryan Nong, Monterey Park, CA (US); Woody D. Leed, Loveland, CO (US); Scott M. Lundberg, Fort Collins, CO (US)

(73) Assignee: Numerica Corporation, Loveland, CO (US)

( * ) Notice: Subject to any disclaimer, the term of this patent is extended or adjusted under 35 U.S.C. 154(b) by 290 days.

(21) Appl. No.: 13/329,290

(22) Filed: Dec. 18, 2011

(65) Prior Publication Data

US 2013/0159263 A1 Jun. 20, 2013

(51) Int. Cl.
*G06K 9/46* (2006.01)

(52) U.S. Cl.
USPC ........... 382/237; 382/235; 382/243; 382/244; 382/305; 345/555; 708/203

(58) Field of Classification Search
USPC .......... 382/235, 243, 244, 305, 307; 345/555; 708/203
See application file for complete search history.

(56) References Cited

U.S. PATENT DOCUMENTS

| | | | |
|---|---|---|---|
| 7,646,924 B2 | 1/2010 | Donoho | |
| 8,018,994 B2 * | 9/2011 | Tong et al. | 375/240 |
| 8,270,738 B2 * | 9/2012 | Raveendran et al. | 382/236 |
| 8,468,244 B2 * | 6/2013 | Redlich et al. | 709/225 |
| 8,543,573 B2 * | 9/2013 | MacPherson | 707/736 |
| 8,555,339 B2 * | 10/2013 | McGloin et al. | 726/2 |
| 8,578,448 B2 * | 11/2013 | McGloin et al. | 726/2 |
| 8,627,152 B1 * | 1/2014 | Deb et al. | 714/49 |
| 8,675,731 B2 * | 3/2014 | Kalevo et al. | 375/240.02 |

OTHER PUBLICATIONS

D.L. Donoho, "Compressed Sensing," IEEE Trans. Inform. Theory, vol. 52, pp. 1289-1306 (Apr. 2006).
Chen et al., "Atomic Decomposition by Basis Pursuit," SIAM J. Sci. Comput., vol. 20, No. 1, pp. 33-61 (1999).
Goldstein et al., "The Split Bergman Method for L1 Regularized Problems," UCLA CAM Report 08-29.
Sole et al., "Morse Description and Geometric Encoding of Digital Elevation Maps," IEEE Transactions in Image Processing, vol. 13, No. 9, pp. 1245-1262 (2004).
Martin et al., "Range Encoding: An Algorithm for Removing Redundancy from a Digitized Message." Video and Data Recording Conference, Southampton, UK, Jul. 2427 (1979).
Hu et al., "Optimal Computer Search Trees and Variable-Length Alphabetic Codes." SIAM Journal on Applied Mathematics, 21(4) 513-532 (1971).

* cited by examiner

*Primary Examiner* — Yosef Kassa
(74) *Attorney, Agent, or Firm* — Samuel M. Freund; Cochran Freund & Young LLC (57) ABSTRACT

A method for compressing a cloud of points with imposed error constraints at each point is disclosed. Surfaces are constructed that approach each point to within the constraint specified at that point, and from the plurality of surfaces that satisfy the constraints at all points, a surface is chosen which minimizes the amount of memory required to store the surface on a digital computer.

22 Claims, 9 Drawing Sheets

LOSSY COMPRESSION OF DATA POINTS USING POINT-WISE ERROR CONSTRAINTS

STATEMENT REGARDING FEDERAL RIGHTS

This invention was made with government support under Contract No. W9132C-08-C-0031 awarded by the U.S. Department of Defense to Numerica Corporation. The government has certain rights in the invention.

FIELD OF THE INVENTION

The present invention relates generally to data compression and, more particularly, to a lossy compression method for point clouds with point-wise error constraints.

BACKGROUND OF THE INVENTION

For data transmission in bandwidth-constrained environments, it is desirable to compress the original data before such transmissions take place. There are two procedures for data compression: lossless and lossy. Lossy procedures often result in better compression ratios than lossless schemes since some of the original data may be discarded. For lossy procedures, either dominant features of the original data or compact representations thereof in other bases are sought. The amount and type of discarded information are dictated by the metric of choice in the compression algorithm.

In basis pursuit (See, for example, S. S. Chen, D. L. Donoho, and M. A. Saunders, *Atomic Decomposition by Basis Pursuit*, SIAM J. Sci. Comput., vol. 20, no. 1, pp. 33-61, (1999); D. L. Donoho, *Compressed Sensing*. IEEE Trans. Inform. Theory, vol. 52, pp. 1289-1306 (April 2006); and U.S. Pat. No. 7,646,924, which issued to David L. Donoho on Jan. 12, 2010), the sparsest (i.e., minimizing the $\|\bullet\|_1$, or standard $l_1$, norm) representation of the original data in a selection of bases is sought. The discarded information follows metrics such as the $\|\bullet\|_p$ norm, where $1 \leq p \leq \infty$ with p=2 and p=∞ being the most common used values. The resulting problem may be implemented using a standard linear programming or convex programming procedure, and therefore may be solved using available computational techniques.

Basis pursuit is a method involving sparse representation of a vector $b \in \mathbf{R}^m$ using an over-complete dictionary of basis vectors, $A \in \mathbf{R}^{m \times n}$. Specifically, given a matrix $A \in \mathbf{R}^{m \times n}$, with m<n, it is of interest to find an $x \in \mathbf{R}^n$ such that Ax=b. There are many such solutions x and the principle is again to choose the solution that is the sparsest. Note that while x is high dimensional, A can be chosen so that x has very few non-zero entries and therefore x can be transmitted efficiently. Mathematically, basis pursuit aims to solve the problem as in:

$$\min_x \|x\|_1 \quad (1)$$

such that $Ax = b$, or $$\min_x \|x\|_1 \quad (2)$$

such that $\|Ax = b\|_p \leq \varepsilon$, where $1 \leq p \leq \infty$ (with p=2 and p=∞ being the most common used values) and $\varepsilon$ is an error tolerance.

One of available computational techniques is as follows: Instead of solving (1), the following unconstrained problem is investigated:

$$\min_x \|x\|_1 + \frac{\mu}{2} \|Ax - b\|_2^2. \quad (3)$$

As $\mu$ approaches ∞, the solution to (3) approaches a solution to (1). Now (3) may be rewritten as the constrained optimization problem $$\min_x \|d\|_1 + \frac{\mu}{2} \|Ax - b\|_2^2 \quad (4)$$

such that d=x.

Using the Lagrangian multiplier argument again, the solution to the following unconstrained problem:

$$\min_x \|d\|_1 + \frac{\mu}{2} \|Ax - b\|_2^2 + \frac{\lambda}{2} \|d - x\|_2^2, \quad (5)$$

approaches one that solves (1) as both $\mu$ and $\lambda$ approach ∞.

By following the argument on "adding back the noise" (so that $\mu$ and $\lambda$ need not be extremely large) as discussed in T. Goldstein and S. Osher, *The Split Bregman Method for $l_1$ Regularized Problems*, UCLA CAM Report 08-29, and the references cited therein, it can be shown that (5) is equivalent to $$(x^{k+1}, d^{k+1}) \leftarrow \operatorname*{argmin}_{x,d} \|d\|_1 + \frac{\mu}{2} \|Ax - b\|_2^2 + \frac{\lambda}{2} \|d - x - b^k\|_2^2 \quad (6)$$

where $b^{k+1} \leftarrow b^k + x^{k+1} - d^{k+1}$. \quad (7)

Using the fact that the $l_1$ and $l_2$ components of the objective functional have been "split," (6) can be solved in two steps:

$$x^{k+1} \leftarrow \operatorname*{argmin}_x \frac{\mu}{2} \|Ax - b\|_2^2 + \frac{\lambda}{2} \|d^k - x - b^k\|_2^2 \quad (8)$$

where $d^{k+1} \leftarrow \operatorname*{argmin}_d \|d\|_1 + \frac{\lambda}{2} \|d - x^{k+1} - b^k\|_2^2.$ \quad (9)

(7)-(9) are known as the Split Bregman algorithm and solving the two resulting optimization problems of (8) and (9), are simpler. For the problem in the first step, it will be shown hereinbelow as part of the present invention that a closed-form solution to this problem with special consideration for A may be obtained. For the problem in the second step, since there is no coupling between the elements of d, the optimal value of d can be computed explicitly using shrinkage operators as follows:

$$d^{k+1} \leftarrow \operatorname{shrink}\left(y^{k+1} + b^k, \frac{1}{\lambda}\right), \quad (10)$$

where shrink $(x,\mu)$ is defined as follows:

$$\operatorname{shrink}(x, \mu) = \begin{cases} x - \mu, & \text{if } x > \mu \\ 0, & \text{if } -\mu \leq x \leq \mu \\ x + \mu, & \text{if } x < \mu \end{cases} \quad (11)$$

In "Morse description and geometric encoding" (See A. Solé, V. Caselles, G. Sapiro and F. Arándiga, *Morse Description and Geometric Encoding of Digital Elevation Maps*. IEEE Transactions in Image Processing, vol. 13, num. 9, pp. 1245-1262, 2004), Morse-topological and drainage structures for basic geometric description of the original data is first computed, and the missing data may be interpolated from these features using a number of models. To control the quality of the compression, the resulting compressed representation of the original data is accompanied by residuals (that is, the difference between the original data and the resulting compressed representation) which are determined using the $\|\cdot\|_\infty$ norm.

SUMMARY OF THE INVENTION

Embodiments of the present invention overcome the disadvantages and limitations of the prior art by providing a method for lossy compression of point clouds with point-wise error constraints, which are not necessarily constant, for representing the uncertainty profile.

Another object of embodiments of the invention is to provide a method for lossy compression of point clouds with point-wise error constraints, which are not necessarily constant, for representing the uncertainty profile, taking advantage of all the available freedom provided by the uncertainty profile of the point cloud to obtain the most compact representation of the original data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the method for compressing a point cloud with imposed error constraints at each point, hereof includes constructing a surface that approaches each point to within the tolerance specified at that point, and of a plurality of surfaces that satisfy the constraints at all points, the chosen surface minimizes the amount of memory required to store the surface on a digital computer.

In another aspect of the present invention, and in accordance with its objects and purposes, the computer implemented method hereof, includes the step of constructing a representation $x \in z, 68^n$ of a cloud of points $b \in \mathbf{R}^m$ with imposed error constraints $\mu \in \mathbf{R}^m$ at each point in an over-complete dictionary $A \in \mathbf{R}^{m \times n}$ such that $|Ax-b| \preceq u$.

In still another aspect of the present invention, and in accordance with its objects and purposes, the computer implemented lossy compression of data points hereof, includes the step of constructing a representation $x \in \mathbf{R}^n$ of a cloud of points $b \in \mathbf{R}^m$ with imposed error constraints $u \in \mathbf{R}^m$ at each point in an over-complete dictionary $A \in \mathbf{R}^{m \times n}$ such that $|Ax-b| \preceq u$.

Benefits and advantages of embodiments of the present invention include, but are not limited to, providing a method for compressing a cloud of points with imposed error constraints at each point, wherein surfaces are constructed that approach each point to within the constraint specified at that point from which a surface is chosen that minimizes the amount of memory required to store the surface on a digital computer.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 2(a)-2(d) do not have the same scale.

DETAILED DESCRIPTION OF THE INVENTION

Briefly, embodiments of the present invention include a method for compressing a cloud of points with imposed error constraints at each point. In one embodiment, a representation of the original point cloud is sought, where the resulting approximation of the original point cloud from this representation approaches each point of the original point cloud to within the tolerance specified at that point. In another embodiment, of a plurality of representations that approximate the original point cloud within the imposed error constraints, the sparsest representation is chosen which minimizes the amount of memory required to store the representation on a digital computer. In another embodiment, an algorithm is disclosed to mathematically place the compression problem in a standard $l_1$ form by introducing two slack variables. Another embodiment of the invention discloses a method that computationally solves the resulting compression problem in a standard $l_1$ form in an efficient manner by representing the cloud of points in the domains of orthonormal bases. Note that less efficient methods do exist for non-orthonormal bases.

Data processing apparatus, such as a computer may be implemented in various forms. As an example, a digital data processing apparatus which includes a processor, such as a microprocessor, personal computer, workstation, controller, microcontroller, state machine, or other processing machine, coupled to a storage device, which may include a fast-access storage and nonvolatile storage. The fast-access storage may include random access memory (RAM), and may be used to store the programming instructions executed by the processor. Nonvolatile storage may include a battery backup RAM, EEPROM, flash PROM, one or more magnetic data storage disks such as a hard drive, a tape drive, or any other suitable storage device. The apparatus may also include input/output devices, such as a line, bus, cable, electromagnetic link, or other means for the processor to exchange data with other hardware external to the apparatus.

In the following description: "Sparsity" is defined as a quantity for measuring the number of zeros populated in a matrix, the more zero entries a matrix has, the sparser it is; a "Basis function" is an element of a particular basis in a function space, where every continuous function in the function space can be represented as a linear combination of basis functions; a "Slack variable" is a variable that is added to an inequality constraint to transform it into two simpler constraints, namely, an equality constraint and a nonnegativity constraint; and a "Bregman iteration" is a method for solving $l_1$ optimization problems, one variant being the Split Bregman iteration, which will be further described hereinbelow.

The reader of this document is assumed to be familiar with the standard notation of linear algebra, in particular the notions of matrices, vectors, matrix vector product and systems of linear equations (See, for example, G. H. Golub and C. F. Van Loan, *Matrix Computations*, Baltimore: Johns Hopkins University Press (1983); and P. Gill, W. Murray, and M. Wright, *Numerical Linear Algebra and Optimization*, Redwood City, Calif.: Addison-Wesley Pub. Co. (1991)). The required background may be obtained by reading books associated with college courses in linear algebra and/or matrix analysis, and it may be useful to have familiarity with signal processing (See, for example, S. Mattat, *A Wavelet Tour of Signal Processing*, Second edition, Academic Press (1999)).

Figure 1:
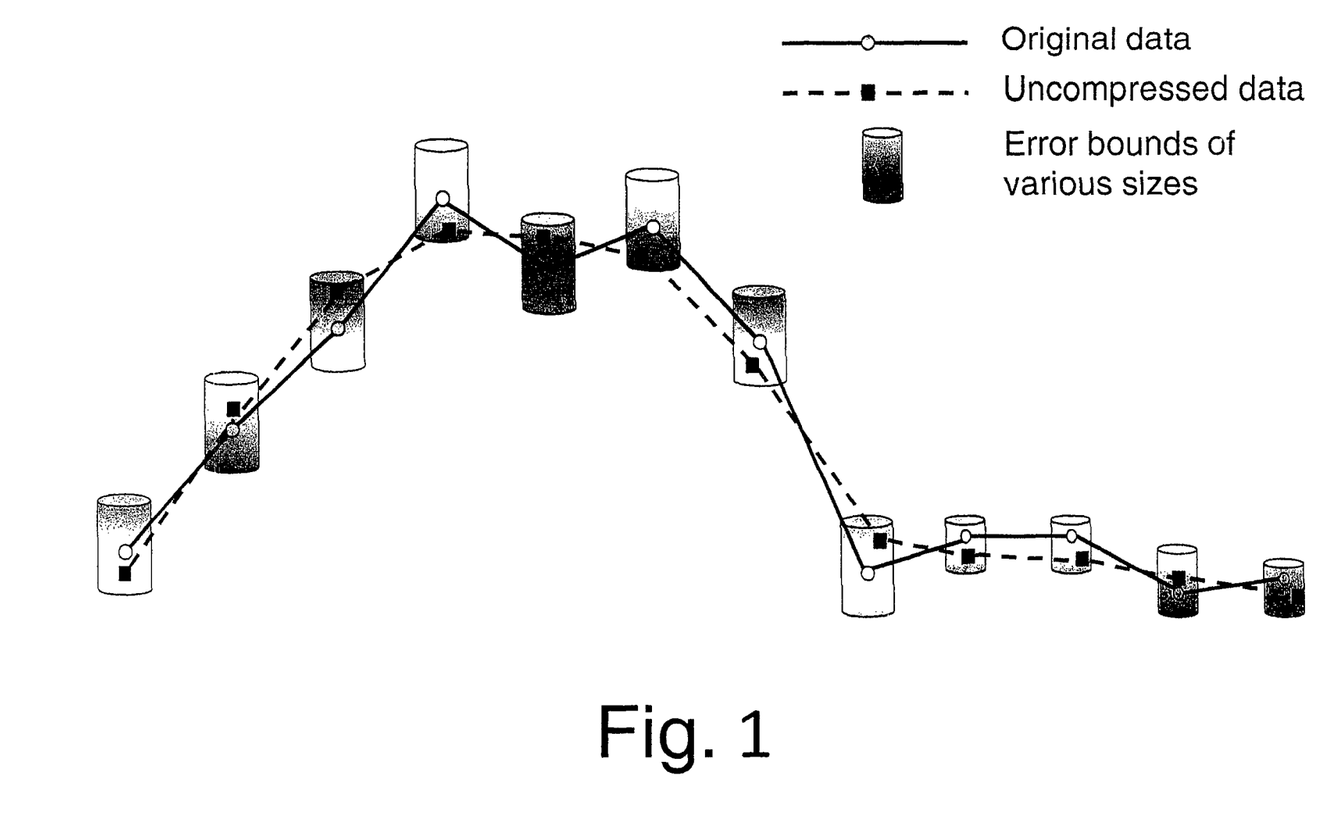
FIG. 1 shows an example of a cloud of points having imposed error constraints (shown as cylinders) at each point, and connected by solid lines, while the points connected by dashed lines illustrate a constructed surface satisfying the point-wise constraints (cylinders).

Reference will now be made in detail to the present embodiments of the invention, examples of which are illustrated in the accompany drawings. For point clouds compression in digital elevation maps (DEM) or light detection and ranging (LiDAR), standard methods such as basis pursuit or "Morse description and geometric encoding" are not appropriate as they either incorrectly discard information or do not take advantage of all of the available freedom. First, the commonly used $\|\cdot\|_2$ norm allows the error in any particular point to be large as long as it is offset by an appropriate decrease in errors in other points. Further, for DEM data, where a guaranteed bound on the error at each point is required (See FIG. 1 hereof), using the $\|\cdot\|_2$ norm for error control is inappropriate. Second, a point cloud from DEM and LiDAR often comes with an uncertainty profile reflecting the reliability of the sensors employed, which is generally not constant. Therefore, if the $\|\cdot\|_\infty$ norm is used for error control when constructing a compact representation of the point cloud, a flat scalar bound (i.e., the infimum of the uncertainty profile) is imposed at every single point, and all the available freedom given by the uncertainty profile is ignored. Third, error control in "Morse description and geometric encoding" is an a posteriori and independent fix as its sole purpose is to ensure satisfaction of an error bound. In other words, the distribution of errors is not used by the compression scheme to improve its performance, but instead is only used for the computation of residuals.

Figure 2:
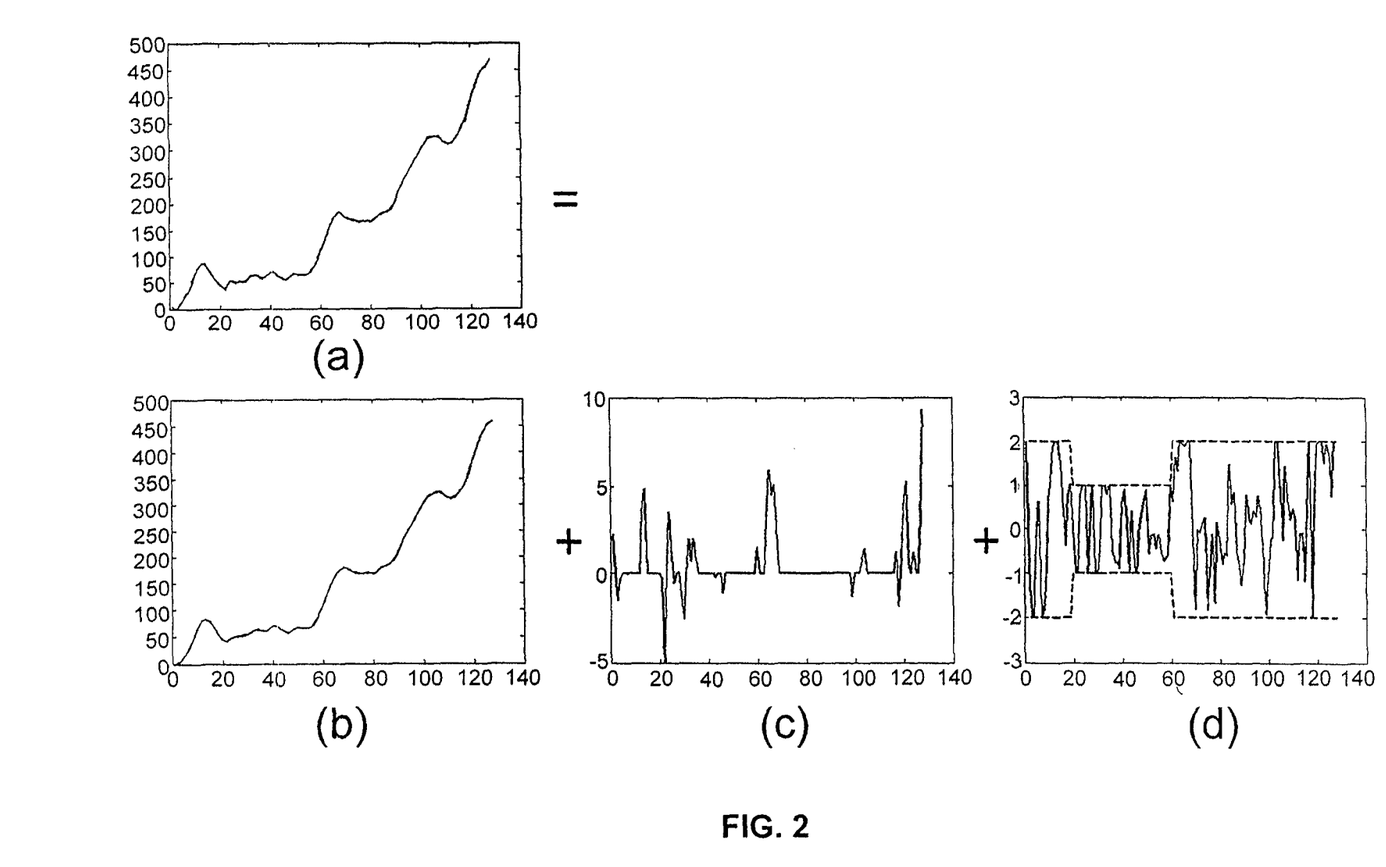
FIG. 2 illustrates a dataset (FIG. 2(a)) decomposed into a smooth portion represented by a linear combination of Fourier modes (FIG. 2(b)) and a rough portion represented by a collection of Delta coefficients (FIG. 2(c)) within a priori prescribed error bounds (FIG. 2(d))
Figure 3:
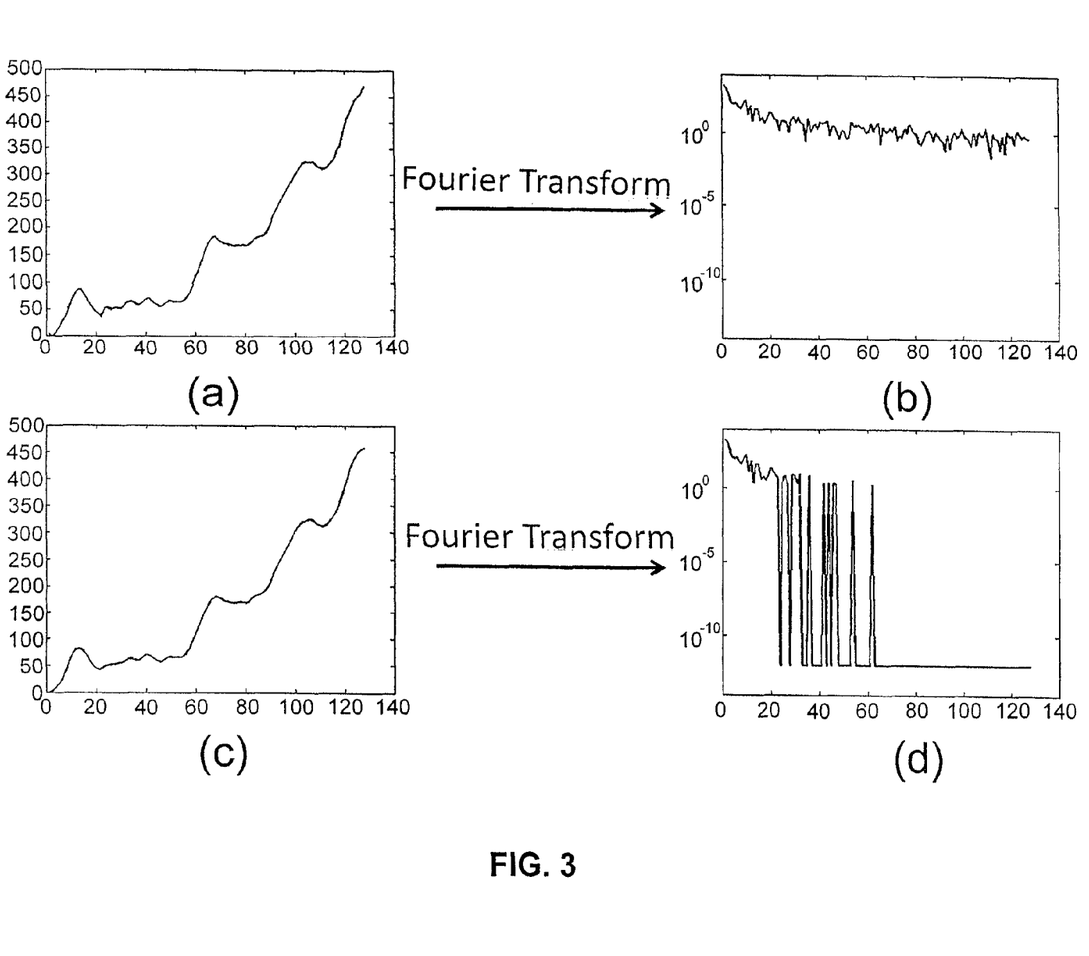
FIG. 3 illustrates the Fourier coefficients for the dataset shown in FIG. 2(a) and now shown in FIG. 3(a), and of its smooth portion shown in FIG. 2(b) and now shown in FIG. 3(c), shown in FIGS. 3(b) and 3(d), respectively showing that the smoother the dataset, the fewer the non-zero Fourier coefficients needed to represent it.

FIG. 2 illustrates a dataset (FIG. 2(a)) decomposed into a smooth portion represented by a linear combination of Fourier modes (FIG. 2(b)) and a rough portion represented by a collection of Delta coefficients (FIG. 2(c)) within a prior prescribed error bounds (FIG. 2(d)), wherein FIGS. 2(a)-2(d) are not drawn to the same scale. FIG. 3 illustrates the Fourier coefficients for the dataset shown in FIG. 2(a) and in FIG. 3(a), and of its smooth portion shown in FIG. 2(b) and in FIG. 3(c), shown in FIGS. 3(b) and 3(d), respectively, illustrating that the smoother the dataset, the fewer the non-zero Fourier coefficients needed to represent it.

The object of interest is assumed to be representable as a vector $b \in \mathbf{R}^m$. The disclosed method results in a sparse representation $x \in \mathbf{R}^n$ of b in a specified over-complete dictionary $A \in \mathbf{R}^{m \times n}$ such that the number of non-zeros p in x is much smaller than m. In addition, the disclosed method delivers an approximate Ax of b to within a specified error tolerance $u \in \mathbf{R}^m$.

Figure 4:
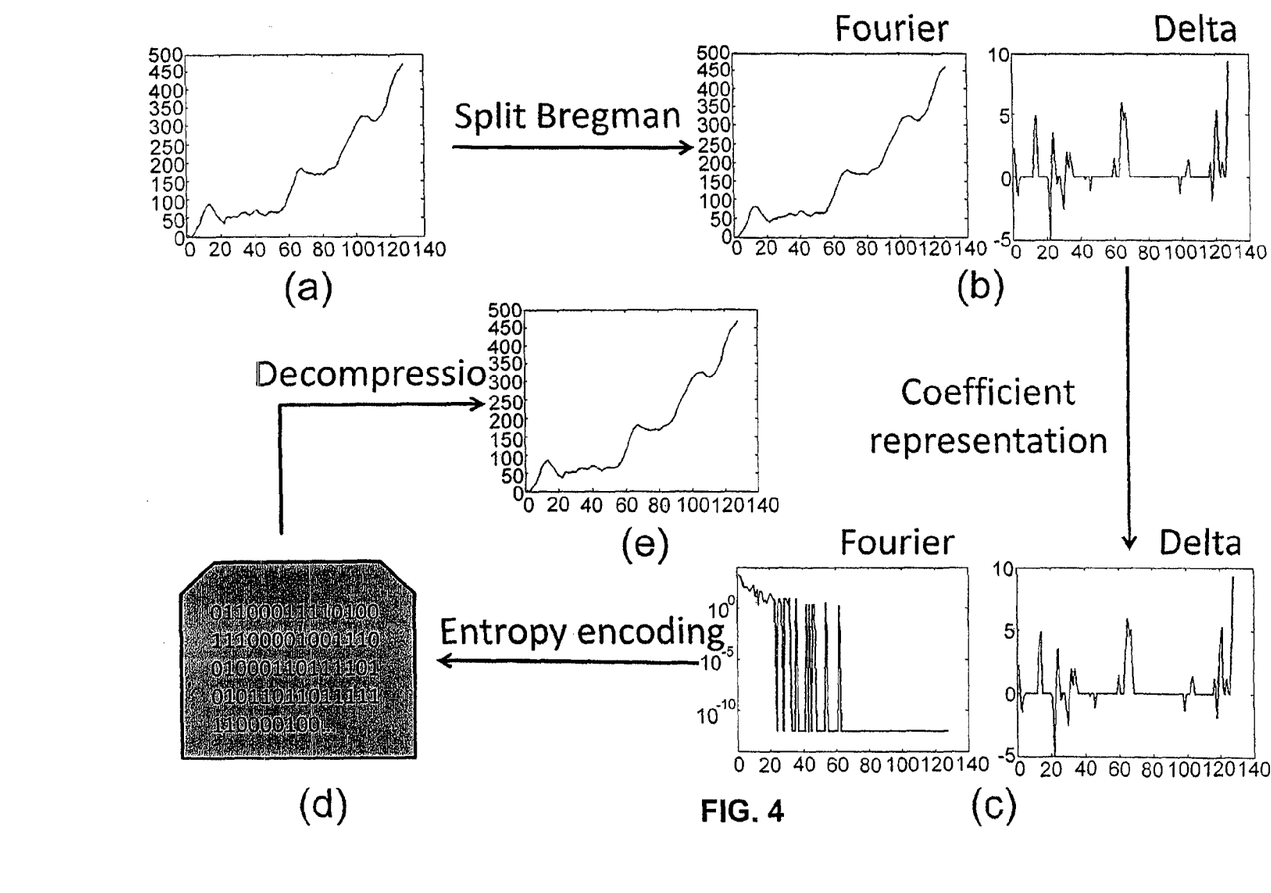
FIG. 4 shows a flow chart of an embodiment of the invention, wherein a curve is generated to fit a dataset illustrated in FIG. 4(a) and its associated point-wise error profile using the split Bregman algorithm to obtain Fourier and Delta coefficients shown in FIG. 4(b), which are quantized to yield integer values that still respect the error bounds illustrated in FIG. 4(c), and are encoded into binary representations for transmission and decoding to reconstruct an approximation of the original dataset, shown in FIG. 4(d).

In FIG. 4 an embodiment of the present method includes the following steps which are performed by a processor, the details of which will be set forth hereinbelow:

1. specifying the point-wise error constraints as a vector, $u \in \mathbf{R}^m$, alongside with the original dataset b as shown in FIG. 4(a);
2. defining slack variables $s_1 \in \mathbf{R}^m$ and $s_2 \in \mathbf{R}^m$ for transforming the problem formulation into standard basis pursuit form;
3. specifying an over-complete dictionary $A \in \mathbf{R}^{m \times n}$ comprising orthonormal bases as shown in FIG. 4(b) for a representation $x \in \mathbf{R}^n$ of b;
4. using the split Bregman algorithm, for efficient computation, to obtain the coefficients of the representation $x \in \mathbf{R}^n$ of b as shown in FIG. 4(c);
5. quantizing the resulting representation x of b to obtain a binary representation via entropy encoding as shown in FIG. 4(d); and
6. decompressing the binary representation in FIG. 4(d) to obtain an approximation of the original dataset b satisfying the point-wise error constraints u as shown in FIG. 4(e).

1. Point-Wise Error Constraints:

In the problem formulation using basis pursuit, the constraint is either an equality as in Ax=b or an inequality as in $\|Ax-b\|_p \leq \epsilon$, where $\|\cdot\|_p$ is the $l_p$ norm of a vector and $\epsilon$ is a scalar. The present constraint is an inequality having an error norm as $|Ax-b| \preceq u$, where $|\cdot|$ is the point-wise absolute value of a vector, $\preceq$ is the point-wise less-than-or-equal-to operator for two vectors, and u is the vector of point-wise error constraints. Thus, the problem of interest is formulated as follows:

$$\min_x \|x\|_1 \quad (12)$$

such that $|Ax - b| \preceq u$.

By letting u be a vector, the present problem of interest remains compressing a point cloud accompanied with an uncertainty profile. In addition, by allowing u to be a vector, advantage may be taken of all the freedom provided by the uncertainty profile in order to obtain the sparsest representation to the original point cloud.

2. Slack Variables:

Introducing two slack variables $s_1$ and $s_2$ and rewriting (12) as follows:

$$\min_x \|x\|_1 \quad (13)$$

such that $Ax - b + s_1 = u$ and $-(Ax - b) + s_2 = u$, where $s_1 \succeq 0$ $s_2 \succeq 0$.

Consider the following $l_1$ optimization problem:

$$\min_y \|y\|_1 \quad (14)$$

such that $Gy = h$,
where $$y = \begin{bmatrix} x \\ s_1 \\ s_2 \end{bmatrix} \quad (15)$$

$$G = \begin{bmatrix} A & \alpha I & 0 \\ -A & 0 & \alpha I \end{bmatrix} \quad (16)$$

and $h = \begin{bmatrix} b + u \\ -b + u \end{bmatrix} \quad (17)$

In $G$, $\alpha \in (0, \infty)$ is a parameter to control the influence of the slack variables $s_1$ and $s_2$ in the objective function. Note that $\alpha(s_1+s_2)=2u$ and that if $s_1 \succeq 0$ and $s_2 \succeq 0$, then the solution of (14) solves (13). Intuitively, large values of $\alpha$ (approaching $\infty$) will lead the $l_1$ problem in (14) to favoring the slack variables $s_1$ and $s_2$ over $x$ in satisfying the constraints. Likewise, small values of $\alpha$ (approaching 0) will result in the opposite. The choice therefore is to let $\alpha$ be small. This is in order to minimize the impact of the slack variables $s_1$ and $s_2$ in the objective function of (14) so that a solution of (14) will be close to one that solves (13).

3. Over-Complete Dictionary:

In (12), the sparsest representation $x$ of $b$ in the over-complete dictionary $A$ subject to the point-wise error constraints is sought. The over-complete dictionary $A$ is found as follows: $A=[F \; I]$, where $F$ and $I \in \mathbf{R}^{m \times n}$ are orthonormal Fourier and Delta bases (i.e., in this case, $n=2m$). It is not strictly necessary that these two bases or only two are used since any orthonormal bases and any number of bases suffice (as will be shown in the Enhancement section). However, these two bases are considered as it has been observed/demonstrated that, for a given dataset, Fourier modes represent its global features well and Delta modes capture local and irregular details. These two bases compete, in the $l_1$ sense, to determine that combination of basis functions provides the sparsest, or most compressed, representation of the point cloud. As will be shown below, the use of an over-complete dictionary of orthonormal bases in the split Bregman iteration leads to an computationally efficient algorithm.

4. Split Bregman Iterations:

Considering now the case where the over-complete dictionary has two orthonormal bases, one Fourier and one Delta. In other words, $A=[F \; I]$ with $F^TF=FF^T=I$. Then (15) and (16) are respectively equivalent to:

$$y = \begin{bmatrix} x_1 \\ x_2 \\ s_1 \\ s_2 \end{bmatrix}$$

-continued and $G = \begin{bmatrix} F & I & \alpha I & 0 \\ -F & -I & 0 & \alpha I \end{bmatrix}$.

The Split Bregman iteration described above in paragraphs [0006], [0007], and [0008] is now applied to this formulation. Specifically, the first step of the split Bregman iteration from (8) now becomes:

$$y^{k+1} \leftarrow \operatorname*{argmin}_y \frac{\mu}{2} \|Gy - h\|_2^2 + \frac{\lambda}{2} \|d^k - y - b^k\|_2^2,$$

the solution $y^{k+1}$ of this problem solves the equations:

$\mu G^T(Gy-h)+\lambda(y-(d^k-b^k))=0$, and hence, the following system is to be solved for $y$:

$$(\mu G^T G + \lambda I)y = \mu G^T h + \lambda(d^k - b^k). \quad (18)$$

With $y$, $G$ and $h$ specified as above, the elements in (18) can be written in more detail with the matrix on the left hand side as follows:

$$\begin{bmatrix} (2\mu+\lambda)I & 2\mu F^T & \alpha\mu F^T & -\alpha\mu F^T \\ 2\mu F & (2\mu+\lambda)I & \alpha\mu I & -\alpha\mu I \\ \alpha\mu F & \alpha\mu I & (\alpha^2\mu+\lambda)I & 0 \\ -\alpha\mu F & -\alpha\mu I & 0 & (\alpha^2\mu+\lambda) \end{bmatrix}$$

and the right hand side as follows:

$$\begin{bmatrix} 2\mu F^T b + \lambda(d_1^k - b_1^k) \\ 2\mu b + \lambda(d_2^k - b_2^k) \\ \alpha\mu(b+u) + \lambda(d_3^k - b_3^k) \\ \alpha\mu(-b+u) + \lambda(d_4^k - b_4^k) \end{bmatrix}.$$

In the above, $d^k$ and $b^k$ have been conformally decomposed with respect to the structure of $y$.

It can be shown that (18) can be simplified so that the matrix is put in upper triangle form:

$$\begin{bmatrix} I & \frac{2\mu}{2\mu+\lambda}F^T & \frac{\alpha\mu}{2\mu+\lambda}F^T & -\frac{\alpha\mu}{2\mu+\lambda}F^T \\ 0 & I & \frac{\alpha\mu}{4\mu+\lambda}I & -\frac{\alpha\mu}{4\mu+\lambda}I \\ 0 & 0 & I & I \\ 0 & 0 & 0 & I \end{bmatrix}$$

The corresponding right-hand-side is then:

$$\begin{bmatrix} c_1 \\ c_2 \\ c_3 \\ c_4 \end{bmatrix},$$

where $$c_1 = \frac{2\mu A_1^T b + \lambda(d_1^k - b_1^k)}{2\mu + \lambda}$$

-continued $$c_2 = \frac{2\mu b - 2\mu A_1(d_1^k - b_1^k) + (2\mu + \lambda)(d_2^k - b_2^k)}{4\mu + \lambda}$$

$$c_3 = \frac{2\alpha\mu u + \lambda(d_3^k - b_3^k + d_4^k - b_4^k)}{\alpha^2\mu + \lambda}, \text{ and}$$

$$c_4 = \frac{\alpha\mu(A_1(d_1^k - b_1^k) + d_2^k - b_2^k - b)}{4\mu + \lambda + \alpha^2\mu} - \frac{2\alpha^2\mu^2(d_3^k - b_3^k - d_4^k + b_4^k)}{(\alpha^2\mu + \lambda)(4\mu + \lambda + \alpha^2\mu)} + \frac{\lambda(d_4^k - b_4^k) + \alpha\mu u}{\alpha^2\mu + \lambda}.$$

This system may now be solved via backward substitution.

5. Quantization:

Once the split Bregman iterations have been completed, the Fourier coefficients $x_1$ and identity coefficients $x_2$ are quantized for final encoding as bit streams. This quantization and encoding is accomplished such that the final representation does not violate any of the error bounds specified by u in (12).

a. Encode Fourier Coefficients:

The Fourier coefficients are quantized using a processor from their floating point values to an appropriate integer representation and the integer values encoded into a binary output stream. This encoding process can be accomplished using standard range coding methods (see, for example, G. Nigel and N. Martin, *Range Encoder Range Encoding: An Algorithm for Removing Redundancy from a Digitized Message*. Video & Data Recording Conference, Southampton, UK, July 2427, 1979), such as a window-based prediction method. Range coding is a form of entropy coding that uses a probability prediction for each symbol to encode the data. In order to predict the probabilities for each symbol, an adaptive windowing method may be used. For example, with a window width of N, a histogram of previous N quantized values is recorded, where the probability of observing the next symbol in the sequence is determined by the histogram. By using a pre-determined value for as-yet unseen symbols, the histogram need only contain those symbol types seen in the past and not those that are yet to appear in the sequence.

As A is the Fourier matrix, the values in $x_1$ tend to decay exponentially. To take advantage of this, $x_1$ is reversed and the values are encoded using the windowing method described hereinabove. This permits the histogram to only contain a few small values for the majority of the encoding, only expanding to accept the larger lower-order coefficient values when necessary. This focuses the range encoder's effectiveness and increases compression efficiency.

b. Encode Identity Coefficients:

Once the Fourier coefficients have been quantized to be $\tilde{x}_1$ as described hereinabove, the constraints in (12) no longer hold. In order to repair this, $x_2$ is adjusted by a processor, as in $$\tilde{x}_2 = b - A_1\tilde{x}_1, \quad (19)$$

which means that by using x in place of x, $$A\tilde{x} = b, \quad (20)$$

where $\tilde{x} = [\tilde{x}_1^T \; \tilde{x}_2^T]^T$. This provides freedom to quantize $\tilde{x}_2$ while still adhering to the error bounds u. To achieve this result, quantization factor δ, which is equal to twice the minimum element of u is computed. This choice for δ guarantees that there exists a quantization of every value in $\tilde{x}_2$ that still satisfies (12).

Once the data is quantized, it is encoded it using a technique known as bit plane coding using a processor. This method expands the image of values represented by the quantized $\tilde{x}_2$ into its binary representation. Range coding is then used to encode the individual binary values of the stack of bit planes. If $\tilde{x}_2$ represents a two-dimensional image and the largest value takes 8 bits to represent, bit plane encoding creates a stack of 8-bit planes and then uses previously observed bits to predict future ones.

This procedure is advantageously combined with gray code values. Binary gray codes permit the expression of binary numbers such that each sequential number differs from the previous value by exactly one bit flip. Using this encoding method renders the binary values in the bit planes more predictable than standard base-2 notation.

A final optimization for encoding values using bit planes can be accomplished by combining prefix-free codes and gray codes to create a set of binary values that are not all constrained to be the same bit length on a processor. Suppose for example that in the example of a two-dimensional image, the largest value requires eight bits while many of the other common values only required a few bits to represent. Rather than encoding the values to the same bit depth, a prefix-free code may be used to vary the number of bits allocated to each symbol.

The Huffman method may be used for optimally assigning binary prefix-free codes. However, this method does not preserve the local structure that results from using gray codes in the simple bit-plane encoding method. Further, similar values may not have similar Huffman codes. This difficulty may be remedied by using order-preserving prefix-free codes, which may be provided in an optimal and computationally efficient manner using Hu-Tucker codes (T. C. Hu and A. C. Tucker, *Optimal Computer Search Trees and Variable-Length Alphabetic Codes*. SIAM Journal on Applied Mathematics, 21(4): 514-532 (1971)). By first encoding all values using Hu-Tucker codes and transforming those codes to gray code representations of the Hu-Tucker values, an optimal prefix-free code can be performed by a computer that still satisfies gray coding properties.

Using the methods described hereinabove, the adjusted identity coefficients $\tilde{x}_2$ may be encoded into a binary stream which can be decoded into an original image that satisfies the bounds described in (12).

c. Data Type:

Among the uses of embodiments of the present invention are the compression of point clouds arising from digital elevation maps (DEM) or light detection and ranging (LiDAR). As described hereinabove, the focus is to find representation of the point clouds in the Fourier and Delta domains. Given a point cloud, Fourier modes computed by a processor are efficient in capturing its global features while Delta modes are good at collecting its local discontinuities, and any anomalous or irregular details left in ensuring that the point-wise error bounds are met. The two types of functions compete in the $l_1$ sense to result in a sparsest representation. As the distribution of Fourier modes is more clustered than that of Delta modes, the former are favored over the latter in the resulting representation. For the Fourier modes to be clustered, the point clouds must be well-sampled; that is, in order for good compression including efficient data encoding, point clouds of a surface should be sampled well.

Figure 5:
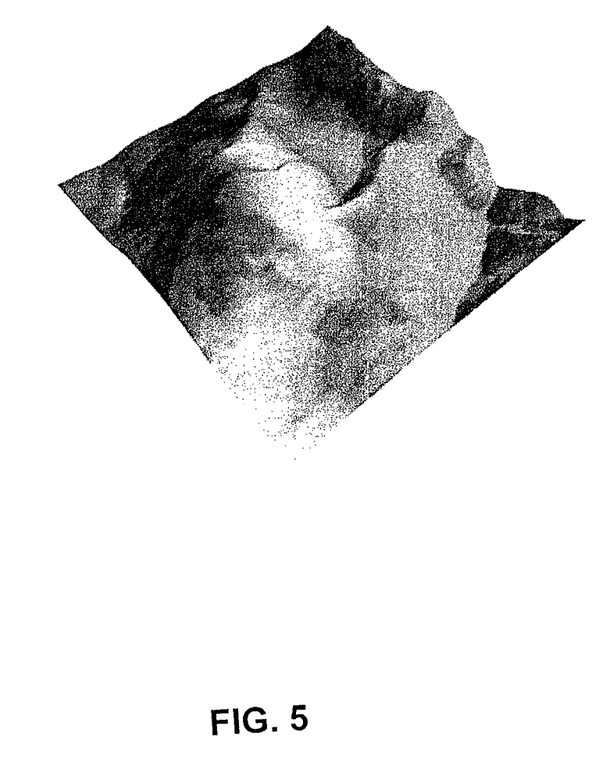
FIG. 5 shows a typical three-dimensional dataset that is often of interest for compression.

Having generally described embodiments of the invention, the following EXAMPLES provide further details. Note that FIG. 5 shows a typical three-dimensional digital elevation map (DEM) that is often of interest for compression. However, in the examples below, we will focus on two-dimensional datasets for simple and demonstrative purposes.

Example 1

In the following, an example is presented to demonstrate embodiments of the present invention. See FIG. 4 for a flow chart of an embodiment of the present method. This example is to compare the formulation using the present point-wise error constraints with that using the infinity norm error constraints (used in basis pursuit and Morse description). This example is to demonstrate that the present technique results in a better compression since it takes advantage of the available freedom provided by point-wise error bounds.

Figure 6:
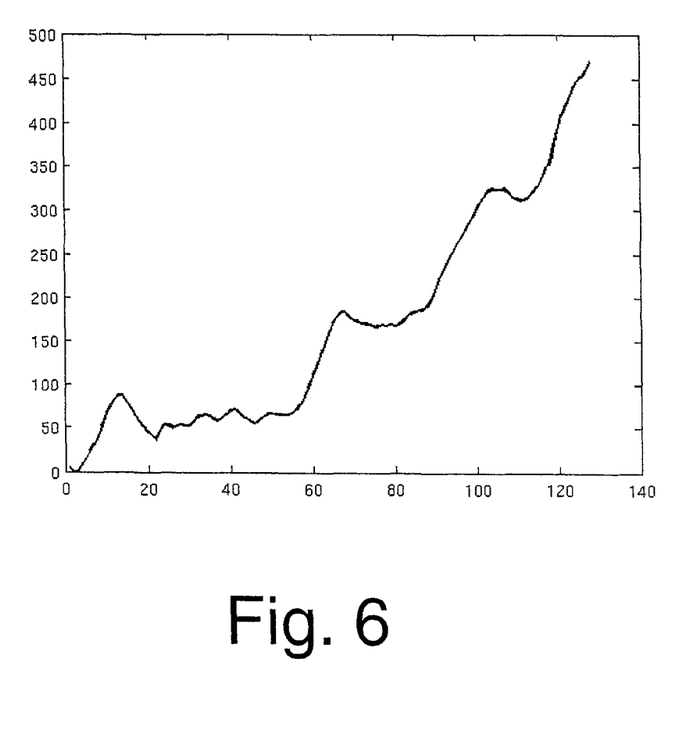
FIG. 6 shows an original two-dimensional dataset used in the accompanying EXAMPLES for demonstration.
Figure 7:
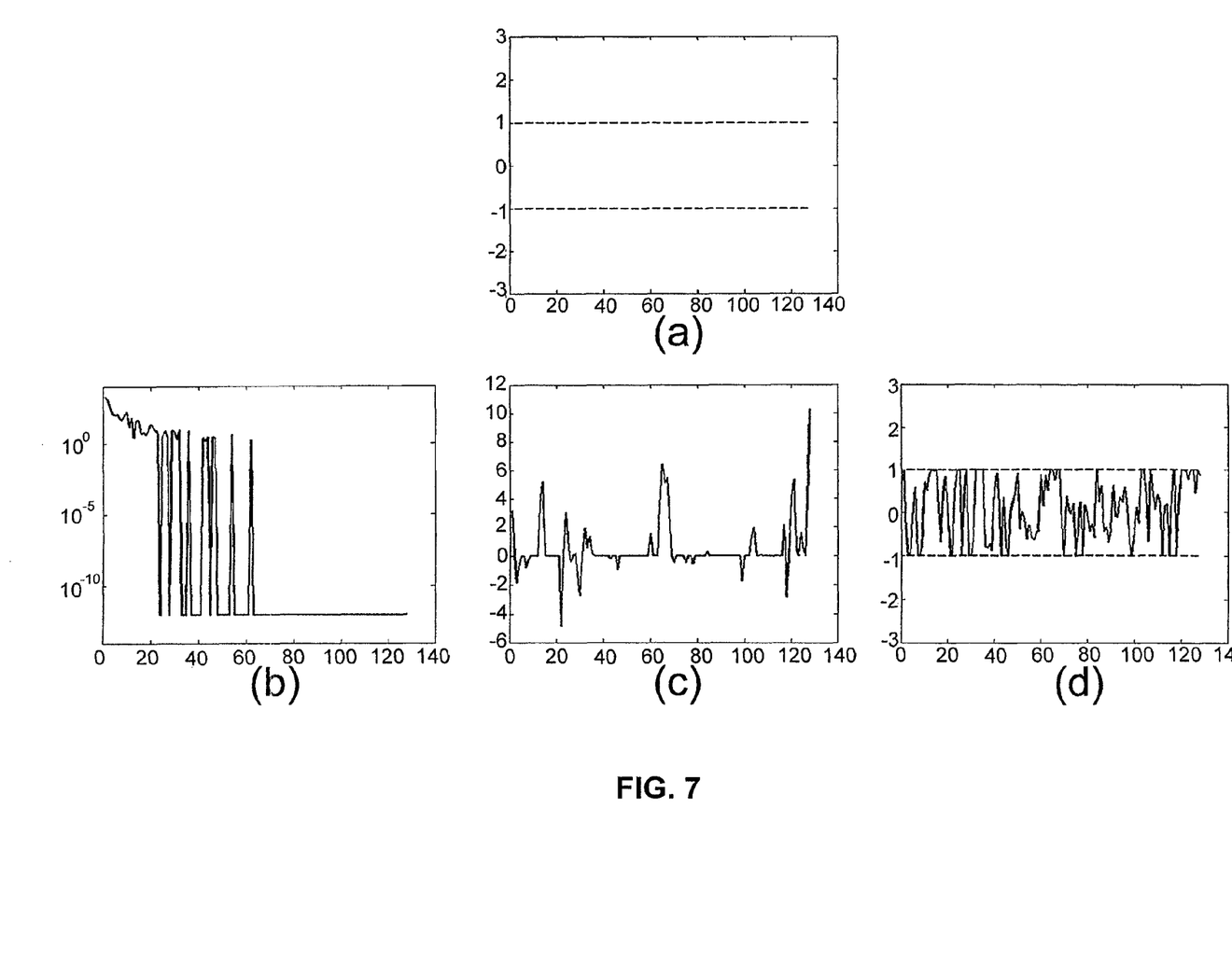
FIG. 7 illustrates a flat error profile (FIG. 7(a)) resulting from employing the infinity norm error constraint formulation, the Fourier and Delta coefficients (shown in FIGS. 7(b) and 7(c), respectively) obtained from using the split Bregman algorithm approximating the original dataset (FIG. 6) within the prescribed error profile (FIG. 7(d)).
Figure 8:
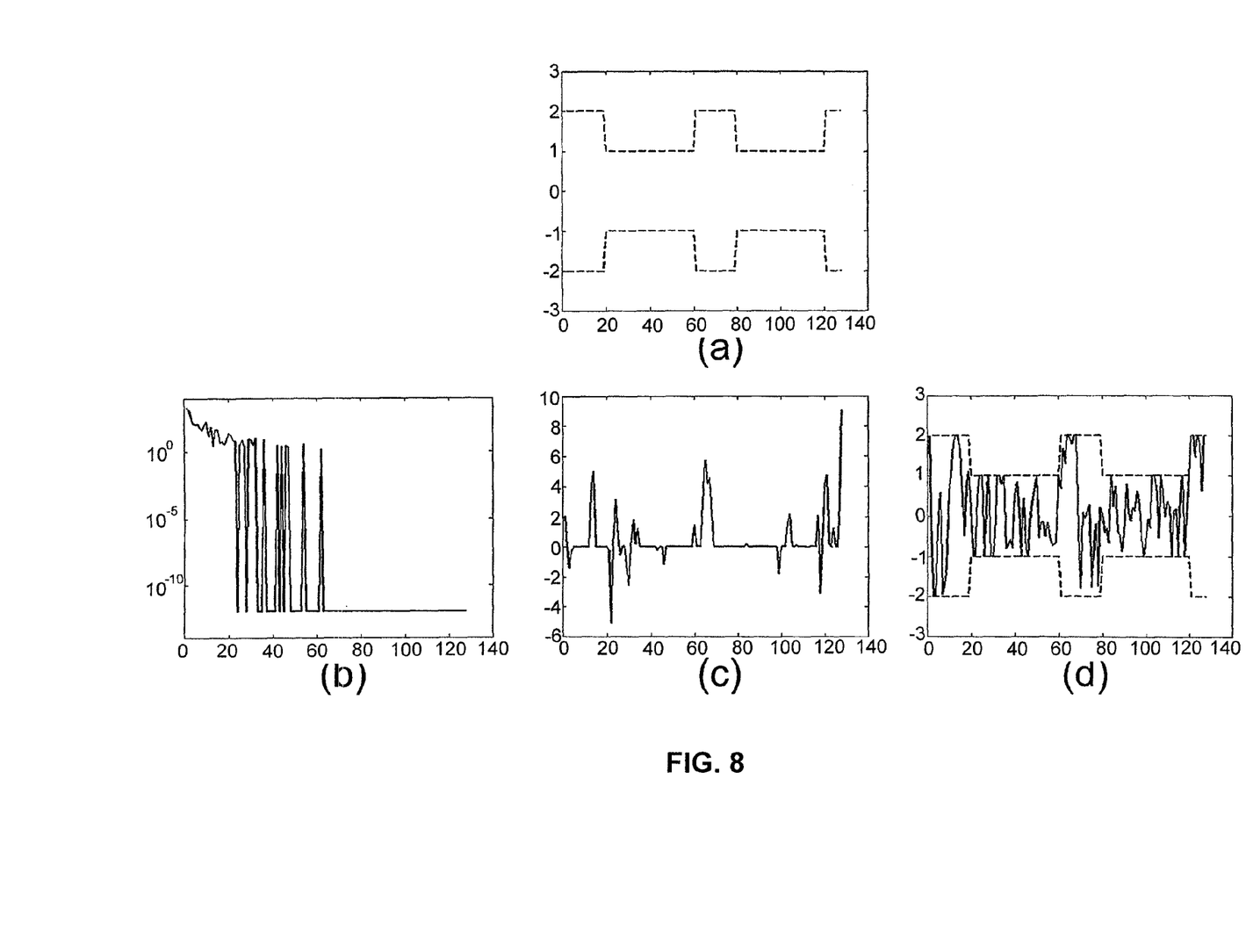
FIG. 8 illustrates the use of a point-wise error profile (FIG. 8(a)), the resulting Fourier and Delta coefficients, shown in FIGS. 8(b) and 8(c), respectively, obtained from using the split Bregman algorithm approximating the original dataset, shown in FIG. 6 within the prescribed error profile, shown in FIG. 8(d).

Consider a two-dimensional elevation dataset as shown in FIG. 6 and a point-wise error profile as shown in FIG. 8(a). If the infinity norm error constraints formulation is used, then the resulting error bounds for the optimization problem will be shown in FIG. 7(a), i.e., the infimum of the error profile in FIG. 8(a) will be used for a flat scalar bound at every single point. With this resulting error profile, the dataset in FIG. 6 is then presented in the Fourier and Delta domains with the corresponding coefficients shown in FIGS. 7(b) and (c), respectively. In addition, the difference between the original elevation dataset and the reconstructed is shown in FIG. 7(d). Note that this difference stays within the error bounds. Numerically, the resulting sparsity for this case is 17.97%.

On the other hand, if the present point-wise error constraints formulation is employed by preserving the provided error profile as shown in FIG. 8(a), then the representation of the original dataset in FIG. 5 in the Fourier and Delta domains is shown in FIGS. 8(b) and (c), respectively. In addition, the difference between the original elevation dataset and the reconstructed is shown in FIG. 8(d). Note that the difference stays within the error bounds. Numerically, the resulting sparsity for this case is 23.44%, which is better than 17.97%.

Example 2

Figure 9:
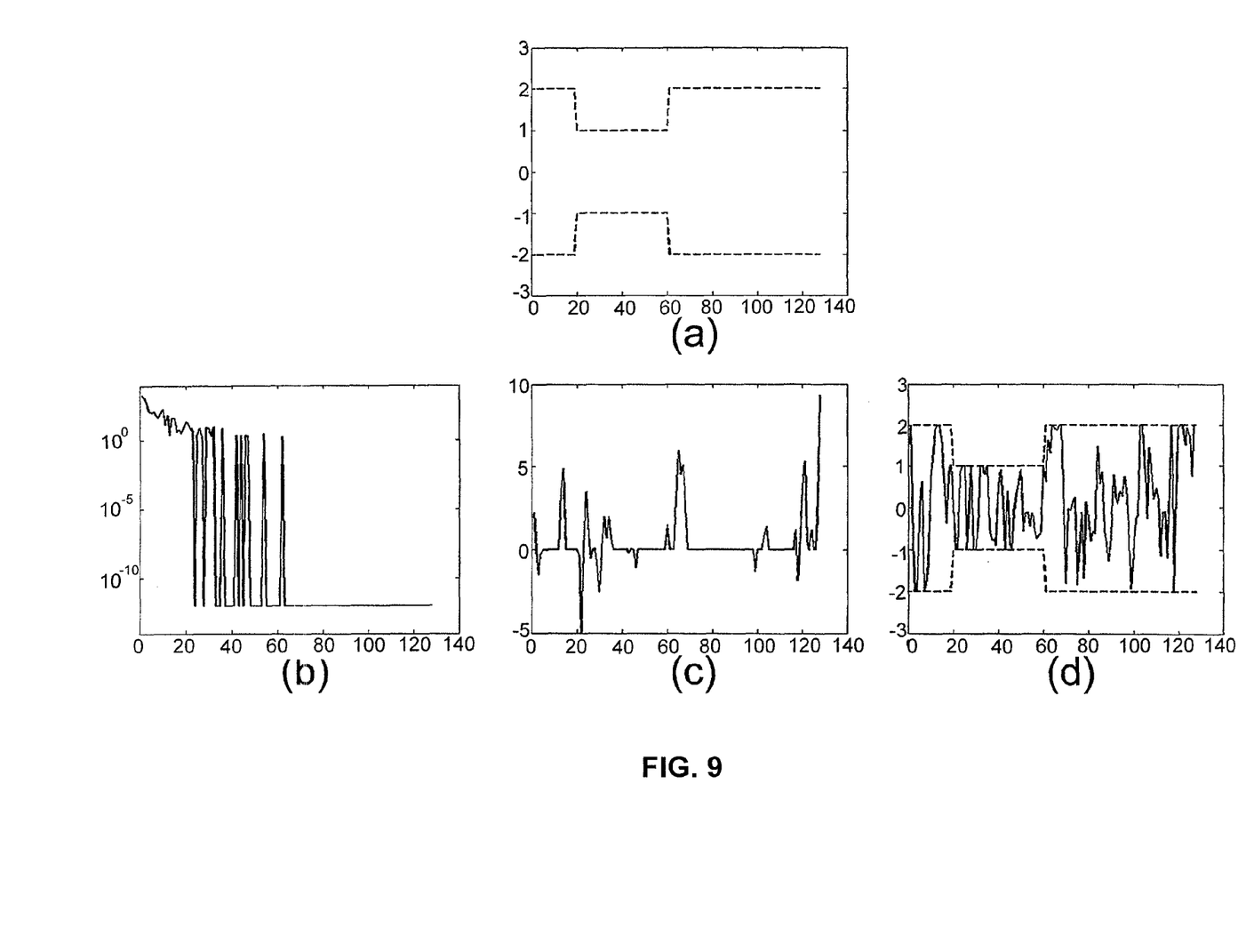
FIG. 9 is similar to FIG. 8, except that a different point-wise error profile (FIG. 9(a)) is used.

The second example is to further emphasize the advantage of using our point-wise error constraints formulation in data compression. In this example, we relax the error bounds as shown in FIG. 8(a) a bit more to obtain the error bounds as shown in FIG. 9(a). With this error profile, the resulting representation of the original dataset in FIG. 6 in the Fourier and Delta domains is shown in FIGS. 9(b) and (c), respectively. In addition, the difference between the original elevation dataset and the reconstructed is shown in FIG. 9(d). Again, note that the difference stays within the error bounds. Numerically, the resulting sparsity for this case is 27.34%, which is better than 23.44%.

Enhancements:

As mentioned hereinabove, embodiments of the invention compress point clouds often arising from digital elevation maps (DEM) or light detection and ranging (LiDAR), and which are pointwise error-constrained. It should be mentioned that embodiments of the method of the invention is not restricted only to the applications of DEM or LiDAR, as long as the object of data compression is a point cloud having imposed error constraints at each point.

The invention explicitly details the use of an over-complete dictionary of two orthonormal bases, especially those of Fourier and Delta, and demonstrates that this results in an efficient method computationally. However, an application of this computational efficiency with the use of the split Bregman algorithm is not restricted to a group of two orthonormal bases. In fact, a group of any number of orthonormal bases results in efficiency. For example, a detailed description using a group of any three orthonormal bases is described below.

Consider now the situation where the over-complete dictionary has three orthonormal bases. That is, $A = [A_1 \ A_2 \ A_3]$ with $A_i^T A_i = A_i A_i^T = I$ for $i = 1, 2, 3$. Then (15) and (16), respectively, are equivalent to:

$$y = \begin{bmatrix} x_1 \\ x_2 \\ x_3 \\ s_1 \\ s_2 \end{bmatrix} \text{ and } G = \begin{bmatrix} A_1 & A_2 & A_3 & \alpha I & 0 \\ -A_1 & -A_2 & -A_3 & 0 & \alpha I \end{bmatrix}.$$

Similar to (8), the following optimization problem results:

$$y^{k+1} \leftarrow \operatorname*{argmin}_y \frac{\mu}{2} \|Gy - h\|_2^2 + \frac{\lambda}{2} \|d^k - y - b^k\|_2^2.$$

The solution $y^{k+1}$ of this problem solves the following system:

$$\mu G^T(Gy - h) + \lambda(y - (d^k - b^k)) = 0.$$

And hence, the following system is solved for y:

$$(\mu G^T G + \lambda I) y = \mu G^T h + \lambda(d^k - b^k). \tag{21}$$

With y, G and h specified as above, the elements in (21) can be written in more detail with the matrix on the left hand side as follows:

$$\begin{bmatrix} (2\mu + \lambda)I & 2\mu A_1^T A_2 & 2\mu A_1^T A_3 & \alpha \mu A_1^T & -\alpha \mu A_1^T \\ 2\mu A_2^T A_1 & (2\mu + \lambda)I & 2\mu A_2^T A_3 & \alpha \mu A_2^T & -\alpha \mu A_2^T \\ 2\mu A_3^T A_1 & 2\mu A_3^T A_2 & (2\mu + \lambda)I & \alpha \mu A_3^T & -\alpha \mu A_3^T \\ \alpha \mu A_1 & \alpha \mu A_2 & \alpha \mu A_3 & (\alpha^2 \mu + \lambda)I & 0 \\ -\alpha \mu A_1 & -\alpha \mu A_2 & -\alpha \mu A_3 & 0 & (\alpha^2 \mu + \lambda)I \end{bmatrix}$$

and the right hand side as follows:

$$\begin{bmatrix} 2\mu A_1^T b + \lambda(d_1^k - b_1^k) \\ 2\mu A_2^T b + \lambda(d_2^k - b_2^k) \\ 2\mu A_3^T b + \lambda(d_3^k - b_3^k) \\ \alpha \mu (b + u) + \lambda(d_4^k - b_4^k) \\ \alpha \mu (-b + u) + \lambda(d_5^k - b_5^k) \end{bmatrix}.$$

In the above, $d^k$ and $b^k$ have been conformally decomposed with respect to the structure of y.

It can be shown that (21) can be simplified so that the matrix is in upper triangle form:

$$\begin{bmatrix} I & \frac{2\mu}{2\mu + \lambda} A_1^T A_2 & \frac{2\mu}{2\mu + \lambda} A_1^T A_3 & \frac{\alpha \mu}{2\mu + \lambda} A_1^T & -\frac{\alpha \mu}{2\mu + \lambda} A_1^T \\ 0 & I & \frac{2\mu}{4\mu + \lambda} A_2^T A_3 & \frac{\alpha \mu}{4\mu + \lambda} A_2^T & -\frac{\alpha \mu}{4\mu + \lambda} A_2^T \\ 0 & 0 & I & \frac{\alpha \mu}{6\mu + \lambda} A_3^T & -\frac{\alpha \mu}{6\mu + \lambda} A_3^T \\ 0 & 0 & 0 & I & I \\ 0 & 0 & 0 & 0 & I \end{bmatrix}.$$

The corresponding right hand side is then:

$$\begin{bmatrix} c_1 \\ c_2 \\ c_3 \\ c_4 \\ c_5 \end{bmatrix}, \text{ where}$$

$$c_1 = \frac{1}{2\mu + \lambda}(2\mu A_1^T b + \lambda(d_1^k - b_1^k))$$

$$c_2 = \frac{2\mu}{4\mu + \lambda} A_2^T b - \frac{2\mu}{4\mu + \lambda} A_2^T A_1(d_1^k - b_1^k) + \frac{2\mu + \lambda}{4\mu + \lambda}(d_2^k - b_2^k)$$

$$c_3 = -\frac{2\mu}{6\mu + \lambda} A_3^T A_1(d_1^k - b_1^k) -$$

$$\frac{2\mu}{6\mu + \lambda} A_3^T A_2(d_2^k - b_2^k) + \frac{2\mu}{6\mu + \lambda} A_3^T b + \frac{4\mu + \lambda}{6\mu + \lambda}(d_3^k - b_3^k)$$

$$c_4 = \frac{1}{\alpha^2 \mu + \lambda}(2\alpha\mu u + \lambda(d_4^k - b_4^k + d_5^k - b_5^k)), \text{ and}$$

$$c_5 = \frac{\alpha\mu}{6\mu + \alpha^2\mu + \lambda}(A_1(d_1^k - b_1^k) + A_2(d_2^k - b_2^k) + A_3(d_3^k - b_3^k)) + \frac{\alpha\mu}{\alpha^2\mu + \lambda}u - \frac{3\alpha^2\mu^2}{(\alpha^2\mu + \lambda)(6\mu + \alpha^2\mu + \lambda)}(d_4^k - b_4^k) + \frac{3\alpha^2\mu^2 + \alpha^2\mu\lambda + 6\mu\lambda + \lambda^2}{(\alpha^2\mu + \lambda)(6\mu + \alpha^2\mu + \lambda)}(d_5^k - b_5^k).$$

The system now can be solved using backward substitution using a processor.

As mentioned in [0037], a compact representation of the original point cloud is sought within a selection of chosen bases. Algorithmically, these bases compete, in the $l_1$ sense, to determine that combination of basis functions provides the sparsest, or most compressed, representation of the point cloud. Thus, the more bases are considered, the wider search space for the sought-after representation is. In terms of these proposed bases, it has been observed that Fourier modes capture global features of the point cloud while Wavelet and Delta functions well represent local and anomalous features, respectively.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method, comprising the step of constructing a representation $x \in \mathbf{R}^n$ of a cloud of points $b \in \mathbf{R}^m$ with imposed error constraints $u \in \mathbf{R}^m$ at each point in an over-complete dictionary $A \in \mathbf{R}^{m \times n}$ such that $|Ax - b| \preceq u$.

2. The method of claim 1, wherein the representation x is compressed with respect to the original point cloud b, such that the amount of electronic memory required to store x is less than that for b.

3. The method of claim 1, wherein the representation x is the solution to the constrained $l_1$ optimization problem, $$\min_x \|x\|_1.$$

4. The method of claim 3, further comprising the step of introducing two slack variables $s_1$ and $s_2$ to transform the constrained $l_1$ optimization problem into $$\min_y \|y\|_1$$

such that $G_y = h$, where $y = [x \; s_1 \; s_2]^T$, $$G = \begin{bmatrix} A & \alpha I & 0 \\ -A & 0 & \alpha I \end{bmatrix}, \text{ and } h = \begin{bmatrix} b + u \\ -b + u \end{bmatrix}.$$

5. The method of claim 4, further comprising the step of using the split Bregman algorithm to solve the resulting constrained $l_1$ optimization problem, $$\min_y \|y\|_1.$$

6. The method of claim 5, wherein A is an overcomplete dictionary of n orthonormal bases.

7. The method of claim 6, wherein $A = [F \; I]$, where F is an orthonormal Fourier basis and I is the Delta basis.

8. The method of claim 6, wherein $n > 2$.

9. The method of claim 8, wherein the orthonormal bases are chosen from Fourier, Wavelet and Delta bases.

10. The method of claim 1, wherein said point clouds are chosen from digital elevation map data points and light detection and ranging data points.

11. A computer implemented lossy compression of data points, comprising the step of constructing a representation $x \in \mathbf{R}^n$ of a cloud of points $b \in \mathbf{R}^m$ with imposed error constraints $u \in \mathbf{R}^m$ at each point in an over-complete dictionary $A \in \mathbf{R}^{m \times n}$ such that $|Ax - b| \preceq u$.

12. The method of claim 11, wherein the representation x is compressed with respect to the original point cloud b, such that the amount of electronic memory required to store x is less than that for b.

13. The method of claim 11, wherein the representation x is the solution to the constrained $l_1$ optimization problem, $$\min_x \|x\|_1.$$

14. The method of claim 13, further comprising the step of introducing two slack variables $s_1$ and $s_2$ to transform the constrained $l_1$ optimization problem into $$\min_y \|y\|_1$$

such that $Gy = h$, where $y = [x \; s_1 \; s_2]^T$, $$G = \begin{bmatrix} A & \alpha I & 0 \\ -A & 0 & \alpha I \end{bmatrix}, \text{ and } h = \begin{bmatrix} b + u \\ -b + u \end{bmatrix}.$$

15. The method of claim 14, further comprising the step of using the split Bregman algorithm to solve the resulting constrained $l_1$ optimization problem, $$\min_y \|y\|_1.$$

16. The method of claim 15, wherein A is an overcomplete dictionary of n orthonormal bases.

17. The method of claim 16, further comprising the step of quantizing the result of the constrained $l_1$ optimization problem, $$\min_y \|y\|_1$$

into binary coefficients.

18. The method of claim 17, further comprising the step of decompressing the quantized binary coefficients.

19. The method of claim 16, wherein A=[F I], where F is an orthonormal Fourier basis and I is the Delta basis.

20. The method of claim 16, wherein n>2.

21. The method of claim 20, wherein the orthonormal bases are chosen from Fourier, Wavelet and Delta bases.

22. The method of claim 11, wherein said point clouds are chosen from digital elevation map data points and light detection and ranging data points.

* * * * *